United States Patent [19]

Viola et al.

[11] 3,949,114

[45] Apr. 6, 1976

[54] PACKAGING OF FOODSTUFFS

[75] Inventors: Giancarlo Viola, Como; Riccardo Austoni, Monza, both of Italy

[73] Assignee: W. R. Grace & Co., Duncan, S.C.

[22] Filed: May 6, 1974

[21] Appl. No.: 467,546

[30] Foreign Application Priority Data
May 10, 1973 United Kingdom............... 22389/73

[52] U.S. Cl. ................ 428/337; 426/126; 426/412; 428/412; 428/425; 428/458; 428/461; 428/463; 428/474; 428/483; 428/520
[51] Int. Cl.² ............ B32B 15/08; B32B 15/20; B32B 27/08; B65B 29/08
[58] Field of Search ................... 161/256, 216, 214; 426/126, 412; 428/458, 461, 463, 520, 483, 474, 425, 337

[56] References Cited
UNITED STATES PATENTS

| | | | |
|---|---|---|---|
| 2,993,806 | 7/1961 | Fisher | 161/216 |
| 3,343,663 | 9/1967 | Seidler | 161/216 |
| 3,373,915 | 3/1968 | Anderson | 161/216 |
| 3,419,654 | 12/1968 | Chiba | 264/210 R |
| 3,560,223 | 2/1971 | Turbak | 426/126 |
| 3,560,325 | 2/1971 | Sogi | 161/256 |
| 3,595,740 | 7/1971 | Gerow | 161/256 |
| 3,740,306 | 6/1973 | Kosbab | 161/216 |
| 3,759,379 | 9/1973 | Wrede | 161/216 |
| 3,836,425 | 9/1974 | Whiting | 161/216 |

*Primary Examiner*—Harold Ansher
*Assistant Examiner*—Ellis P. Robinson
*Attorney, Agent, or Firm*—John J. Toney; William D. Lee, Jr.

[57] ABSTRACT

The invention relates to polymeric laminates for packaging. According to the invention, such laminates contain an oxygen barrier layer which is composed of a hydrolysed olefin/vinyl ester copolymer, preferably a hydrolysed ethylene/vinyl acetate copolymer. Other layers in the laminate protect the oxygen barrier layer from moisture and provide a heat-sealable surface layer. The laminates withstand the temperatures of 80°–130°C employed in pasteurisation and sterilisation procedures, and are therefore of value in the preparation of pasteurised and sterilised packages of oxygen-sensitive foodstuffs.

3 Claims, No Drawings

PACKAGING OF FOODSTUFFS

FIELD OF THE INVENTION

This invention relates to laminates for use in the preparation of pasteurised or sterilised packages containing oxygen-sensitive foodstuffs, especially precooked foodstuffs.

DESCRIPTION OF THE PRIOR ART

Many different laminates have been proposed for such use, but all the known laminates are unsatisfactory in one respect or another. The provision of a satisfactory oxygen barrier layer has given rise to the most serious problems. Such a barrier layer is of course essential, and furthermore it is a practical requirement that the failure rate should be extremely low, since if the contents of only one package in a consignment should go bad through failure of the barrier layer, all the other packages are immediately suspect.

Many of the known laminates containing oxygen barrier layers are wholly unsuitable for use in pasteurisation and sterilisation procedures, in which temperatures of 80° to 130°C are employed, particularly in sterilisation procedures, in which the package is preferably subjected to temperatures of up to 130°C, e.g. 125° – 130°C. Thus the vinylidene chloride copolymers used as oxygen barrier materials have low softening points which render them unsuitable for such use, and the acrylonitrile copolymers used as barrier materials are unsuitable because of their low heat distortion temperatures. Over recent years, the development of pasteurisable and sterilisable laminates has centred on the use of aluminum foils as the oxygen barrier component. Aluminium foil has excellent oxygen barrier properties in the laminates as they are first prepared, but the combination of heat and flexing to which the laminate is subjected during pasteurisation or sterilisation tends to cause the development of pinholes either during pasteurisation or sterilisation or during subsequent handling of the packages. Such pinholes cause a serious increase in oxygen permeability. This tendency can be controlled to a useful degree by sandwiching the aluminium foil between two biaxially oriented films which are identical or have very similar physical characteristics, so as to produce a balanced laminate. However, this requirement itself represents a serious limitation on the grounds of convenience and cost in preparation of the laminates. Furthermore such laminates cannot be thermoformed.

SUMMARY OF THE INVENTION

We have now surprisingly discovered that the oxygen barrier layer in laminates which are subjected to pasteurisation or sterilisation can be provided by a copolymer obtained by hydrolysis of a copolymer containing 2 to 60 mole percent of units derived from one or more α-olefins and 20 to 95 mole percent of units derived from one or more vinyl esters of carboxylic acids, the degree of hydrolysis being such that at least 85 percent of the vinyl ester units are hydrolysed.

DESCRIPTION OF THE PREFERRED EMBODIMENTS

The other layers of the laminate will of course be determined at least in part by the particular way in which the laminate is to be used. Thus the layers must be resistant to pasteurisation and sterilisation procedures and one of the outer layers of the laminate must be composed of a heat-sealable polymer so that a hermetically sealed package can be produced by heat sealing. Where the laminate is to be thermoformed, the various layers must be capable of undergoing the irregular deformation and stretching involved in thermoforming without rupture or delamination. When the laminate is to be used flat, e.g. as the flat lid of a thermoformed package or in the production of essentially flat pouches, at least one of the layers is preferably a biaxially oriented film so as to provide the necessary abuse resistance. It is generally desirable that the laminate should contain, on each side of the barrier layer, a protective layer which is substantially impermeable to moisture. This is because the hydrolysed olefin/vinyl ester copolymer has a tendency to absorb water, and if it does so, its oxygen permeability is increased. The layer of heat sealable polymer will usually provide one such layer. In the simplest case the laminate will consist of only three layers, namely the heat-sealable layer, the hydrolysed olefin/vinyl ester copolymer layer and a substrate layer, typical minimum thickness for which layers are 0.5, 0.1 and 0.5 mil (0.012, 0.0025 and 0.012 mm) respectively.

The laminate may also contain a layer of aluminium, e.g. an aluminium foil or a vaccum-deposited layer of aluminium as one of the inner layers, its function being to act as a barrier to visible and ultra-violet light. Though an aluminium foil may in fact also function as a barrier layer if the other layers of the laminate and the conditions of treatment are such that pinholes do not develop, it is unnecessary to take the precautions required in the prior art to prevent the formation of pinholes, because the hydrolysed olefin/vinyl ester layer provides the necessary oxygen barrier layer. An advantage of the present invention is that it makes it possible to use aluminium foils having a thickness below the minimum thickness of about 9 microns previously thought to be necessary in sterilisable laminates. In this invention, aluminium foils of thickness as little as 6 microns, e.g. 6–12 microns, say about 7 microns, can be used, subject to any limitations imposed by the particular method employed to manufacture the laminate.

The olefins in the copolymers used in this invention preferably contain 2 to 4 carbon atoms, e.g. ethylene, propylene, butene-1 and isobutylene. Especially preferred is ethylene. The vinyl ester copolymerised with the olefin and subsequently hydrolysed to form a olefin/vinyl alcohol copolymer is preferably vinyl formate, vinyl acetate, vinyl prpopionate, vinyl butyrate or vinylbenzoate. The vinyl ester content of the copolymer is at least 85 percent hydrolysed and the residual ester content of the copolymer is normally less than 5 percent, preferably less than 3 percent, by weight. The preferred olefin/vinyl alcohol copolymers have an olefin content of 10 to 40 percent, preferably 20 to 30 percent, and a vinyl alcohol content of 90 to 60 percent, preferably 75 to 70 percent, the percentages being by weight based on the weight of the copolymer.

The heat-sealable layer of the laminate may be composed of any of the known heat-sealable polymers, e.g. medium and high density polyethylene, alone or mixed with polyisobutylene; polypropylene; ethylene-propylene copolymers; ionomeric resins; polybutene-1; and blends of such polymers.

The substrate layer of the laminate is preferably composed of a polyamide, which may be a homopolyamide such as polycaprolactam or polyhexamethyleneadipamide or a copolyamide; a polyester such as a polyalkylene terephthalate or isophthalate; a polycarbonate; polypropylene; a polyallomer; poly(4-methyl-pentene-1); polybutene-1; polystyrene; polyvinylchloride; medium or high density polyethylene; an acrylonitrile-butadiene-styrene resin; or a methacrylonitrile-butadiene-styrene resin; or a blend of two or more such polymers.

The laminate can be produced in various ways. Single layers can be formed from the corresponding polymers and combined in a typical adhesion lamination operation. Alternatively, depending upon the particular structure to be manufactured, one or more of the layers can be preformed and the remaining layers applied by extrusion coating or extrusion lamination. Another method involves extruding the individual layers through separate dies and joining in an appropriate manner the extruded layers whilst they are in the thermoplastic region.

A particularly preferred method of production involves the simultaneous coextrusion of the several resins as a laminar extrudate through a single die which may either be a flat die or a tubular die. If the adhesion between the various resins simultaneously coextruded is too low and delamination can occur during use, adhesives may be used, particularly the so called hot melt adhesives.

Conversion of the laminates into heat-sealed packages containing foodstuffs can be effected by means well known in the art and does not require detailed description.

The following Examples illustrate the invention. Percentages are by weight. Example 10 is included for comparative purposes.

EXAMPLE 1

Conventional adhesive lamination was used to produce a laminate having the composition:
A. Polycaprolactam film (Platilon CFT from Plate GmbH Germany)
B. Polyurethane adhesive (UK 3640 from Henkel, Germany)
C. Film of hydrolysed ethylene-vinylacetate copolymer containing about 25 percent of ethylene and 75 percent of vinyl alcohol. The hydrolysis degree was 98 percent.
D. Polyurethane adhesive (UK 3640 from Henkel, Germany)
E. Non-oriented polypropylene film (Moplefan BT from Montedison, Italy)

The thickness of the successive layers expressed in microns was 20/4/17/4/50. The laminate had an oxygen permeability of less than 2 mls/m$^2$ 24 hours atm at 23°C.

The laminate was thermoformed to a draw depth pf 2 cms and showed no evidence of rupture, maintaining the excellent oxygen impermeability.

The thermoformed laminate was hermetically sealed with a conventional aluminium-containing laminate having a non-oriented polypropylene heat-sealing layer. The package was found to withstand sterilisation in an autoclave at 125°C.

The thickness of the polycaprolactam film can be increased up to 100 microns when a deeper draw or higher rigidity is required.

EXAMPLE 2

A laminate as described in Example 1 was made except that the polypropylene was replaced by the blend of high density polyethylene and polyisobutylene (70/30 percent) sold by Continental Can Co. (USA) under the tradename C-79. The laminate film had an oxygen permeability of less than 2 ml/m$^2$ 24 hours atm and could be sterilised at 115°C.

EXAMPLE 3

A laminate as described in Example 2 was made except that the adhesive between the layers was omitted and the whole structure was produced by coextrusion through a three supply channel, single exit flat die at a temperature of 25°C. The laminate had properties similar to those of the laminate prepared in Example 2.

EXAMPLE 4

Conventional adhesive lamination was used to produce a laminate having the composition:
A. Biaxially oriented polyethylene terephthalate, (Mylar from Du Pont),
B. Polyurethane adhesive (UK 3640 from Henkel),
C. Film of hydrolysed ethylene-vinylacetate copolymer containing about 25 percent by weight ethylene and 75 percent by weight vinyl alcohol, the hydrolysis degree being 98 percent.
D. Polyurethane adhesive (UK 3640 from Henkel),
E. Non-oriented polypropylene film (Moplefan BT)

The thickness of the successive layers expressed in microns was:

12/4/17/4/40

The laminate had an oxygen permeability of less than 2 ml/m$^2$ 24 hours atm.

The laminate as converted into three-seal pouches which were then sterilised at 127°C. for one hour. After this sterilisation, the laminate did not show delamination and retained its excellent oxygen impermeability.

EXAMPLE 5

A laminate as described in Example 4 was prepared except that the polypropylene was replaced by a layer, 50 microns thick, of the blend of polyethylene and polyisobutylene (70/30 percent) used in Example 2.

The laminate withstood sterilisation at 125°C for one hour without losing its excellent initial oxygen impermeability.

EXAMPLE 6

Conventional adhesive lamination was used to produce a laminate having the composition:
A. Biaxially oriented polycaprolactam film (Emblem from Unitika),
B. Polyurethane adhesive,
C. Film of hydrolysed ethylene-vinylacetate copolymer containing about 25 percent by weight ethylene and 75 percent vinyl alcohol, the hydrolysis degree being 98 percent,
D. Polyurethane adhesive.
E. Non-oriented polypropylene film (Moplefan BT)

The thickness of successive layers expressed in microns was:

15/4/17/4/40

The laminate had an oxygen permeability of less than 2 ml/m² 24 hours atm, and this remained almost unchanged after sterilisation at 124°C. for one hour.

EXAMPLE 7

A laminate as described in Example 6 was made except that the polypropylene was replaced by a layer 50 microns thick of the blend of polyethylene and polyisobutylene (70/30 percent) used in Example 2.

The laminate structure withstood sterilisation at 125°C for one hour without losing its excellent initial oxygen impermeability.

EXAMPLE 8

Conventional adhesive lamination was used to produce a laminate having the composition:
A. Biaxially oriented polyethylene terephthalate film (Mylar from Du Pont)
B. Polyurethane adhesive,
C. Aluminium foil,
D. Polyurethane adhesive,
E. Film of hydrolysed ethylene-vinylacetate copolymer containing about 25 percent by weight ethylene and 75 percent vinyl alcohol, the hydrolysis degree being 99 percent,
F. Polyurethane adhesive,
G. Non-oriented polypropylene film (Moplefan BT)

The thickness of successive layers expressed in microns was:

12/4/9/4/17/4/75

The laminate was converted into pouches which were filled with precooked foodstuffs, evacuated, sealed and sterilised at 130°C for one hour. After sterilisation, the pouches were submitted to a simulated abuse resistance test to induce the formation of pinholes in the aluminium foil layer. In spite of the formation of a great number of such pinholes, so that the aluminium layer no longer functions as an oxygen barrier layer, but only as a barrier to light, the initial oxygen impermeability of the pouches remained almost unchanged, thanks to the presence of the layer E.

EXAMPLE 9

Example 8 was repeated except that the layer of polypropylene was replaced by a layer 75 microns thick of the blend of polyethylene and polyisobutylene (70/30 percent) used in Example 2. Substantially the same results were obtained.

EXAMPLE 10

Example 9 was repeated except that the layer E was replaced by a film 20 microns thick of polyvinyl alcohol (a fully hydrolysed polyvinylacetate polymer). In the sterilisation process at 130°C the polyvinyl alcohol layer became completely delaminated from the aluminium foil. Sterilisation was, however, possible at a maximum sterilisation temperature of 100°–110°C.

EXAMPLE 11

Conventional extrusion coating procedure was used to produce a laminate having the composition:
A. Biaxially oriented polyethylene terephthalate film (Mylar from Du Pont),
B. Extruded polypropylene resin,
C. Aluminium foil,
D. Extruded polypropylene resin,
E. Film of hydrolysed ethylene-vinylacetate copolymer containing about 25 percent by weight ethylene and 75 percent by weight vinyl alcohol the hydrolysis degree being about 98 percent.
F. Extruded polypropylene resin,
G. Non-oriented polypropylene film.

The thickness of successive layers expressed in microns was as follows:

12/15/9/15/17/15/40

In this example the polyurethane adhesive has been replaced by a thin layer of polypropylene resin extruded at a temperature above 300°C to have better adhesion between the layers.

EXAMPLE 12

Conventional adhesive lamination was used to produce a laminate having the composition:
A. Biaxially oriented polyethyleneterephthalate film (Mylar from Du Pont), metallised on the outer side by evaporation of aluminium under vacuum,
B. Polyurethane adhesive,
C. Film of hydrolysed ethylene vinylacetate copolymer containing about 25 percent by weight ethylene and 75 percent vinyl alcohol, the hydrolysis degree being about 98 percent.
D. Polyurethane adhesive,
E. Non-oriented polypropylene film.

The thickness of the successive layers expressed in microns was:

12/4/17/4/50

The laminate was converted into pouches and sterilised at 128°C for one hour. The shelf-life of the packaged perishable food was comparable to that of Example 8.

EXAMPLE 13

Example 12 was repeated except that the polypropylene was replaced by a layer 50 microns thick of the blend of polyethylene and polyisobutylene used in Example 2. The laminates had substantially the same properties as the laminate of Example 12.

Other laminates for use in this invention include:
polycaprolactam/HOVE (1)/h.d. polyethylene
Polypropylene/HOVE/C-79
Polypropylene/HOVE/polypropylene
Bioriented polyethylene terephthalate/HOVE/polypropylene
Bioriented polyethylene terephthalate/HOVE/C-79
Polybutene-1/HOVE/m.d. polyethylene
Polybutene-1/HOVE/ionomer resin
Poly(4-methyl-pentene-1)/HOVE/polypropylene
Poly(4-methyl-pentene-1)/HOVE/ionomer resin
Acrylonitrile-butadiene-styrene/HOVE/polypropylene
Acrylonitrile-butadiene-styrene/HOVE/C-79
Methacrylate-butadiene-styrene/HOVE/polypropylene
Methacrylate-butadiene-styrene/HOVE/C-79
Polycarbonate/HOVE/polypropylene
Polycarbonate/HOVE/C-79
(1) Hydrolised olefin/vinyl ester.

We claim:
1. A laminate for use in making packages which may be sterilized in the temperature range of 80° to 130°C (176° to 266°F) and which are suitable for oxygen sensitive foodstuffs comprising:

a. an outermost heat sealable layer which is substantially impermeable to moisture, said layer having a minimum thickness of 0.5 mil (12 microns);

b. an intermediate oxygen barrier layer comprising a copolymer which is obtained by hydrolysis of a copolymer containing 10 to 40 mole percent of units derived from at least one alpha-olefin containing 2 to 4 carbon atoms and 90 to 60 percet of units derived from at least one vinyl ester of a carboxylic acid and in which at least 85 percent of the vinyl ester units are hydrolysed, said oxygen barrier layer having a minimum thickness of 0.1 mil (2.5 microns);

c. a substrate layer comprising a polymer which is substantially impermeable to moisture and resistant to pasteurization and sterilization, said substrate layer having a minimum thickness of 0.5 mil (12 microns); and, d. an aluminum foil layer having a thickness in the range of 0.25 mil (6 microns) to 0.5 mil (12 microns), said aluminum being between said heat-sealable and substrate layers.

2. The laminate according to claim 1 wherein the layer of aluminum is an aluminum foil less than 9 microns thick.

3. The laminate according to claim 1 wherein the barrier layer comprises a hydrolysed ethylene/vinyl acetate copolymer.

* * * * *